US011118519B2

United States Patent
Lee et al.

(10) Patent No.: US 11,118,519 B2
(45) Date of Patent: Sep. 14, 2021

(54) METHOD AND SYSTEM OF CONTROLLING HYBRID ELECTRIC VEHICLE FOR REMOVING RESIDUAL PURGE GAS

(71) Applicants: Hyundai Motor Company, Seoul (KR); Kia Motors Corporation, Seoul (KR)

(72) Inventors: Seung Han Lee, Gyeonggi-do (KR); Il Kwon Park, Seoul (KR); Dae Heung Lee, Seoul (KR); In Eok Cho, Incheon (KR); Jeong Ho Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 239 days.

(21) Appl. No.: 16/524,730

(22) Filed: Jul. 29, 2019

(65) Prior Publication Data
US 2020/0173381 A1 Jun. 4, 2020

(30) Foreign Application Priority Data
Nov. 30, 2018 (KR) .......................... 10-2018-0151743

(51) Int. Cl.
*F02D 41/00* (2006.01)
*B60W 10/02* (2006.01)
(Continued)

(52) U.S. Cl.
CPC ............ *F02D 41/004* (2013.01); *B60L 53/00* (2019.02); *B60W 10/02* (2013.01); *B60W 10/06* (2013.01); *B60W 20/40* (2013.01); *F02D 41/0045* (2013.01); *F02D 41/1401* (2013.01); *F02M 25/0836* (2013.01); *F02M 35/10222* (2013.01); *B60K 6/48* (2013.01);
(Continued)

(58) Field of Classification Search
CPC .... F02D 41/00; F02D 41/004; F02D 41/0045; F02D 41/1401; F02D 2041/1433; F02D 2200/1002; F02D 2200/101; B60W 10/02; B60W 10/06; B60W 20/40; B60K 6/48; B60K 2006/4825; B60Y 2200/92; B60Y 2300/91; B60Y 2400/112; B60L 53/00; F02M 25/0836; F02M 35/10222
See application file for complete search history.

(56) References Cited

U.S. PATENT DOCUMENTS 6,519,513 B2 * 2/2003 Nakagawa .............. F02N 11/04
701/22

* cited by examiner

*Primary Examiner* — Hieu T Vo
(74) *Attorney, Agent, or Firm* — Mintz Levin Cohn Ferris Glovsky and Popeo, P.C.; Peter F. Corless (57) ABSTRACT

A method of controlling a hybrid electric vehicle is provided. The method includes determining whether a condition for turning off an engine is satisfied and determining engine clutch disengaging time and residual purge gas consuming time from engine driving status information when the condition is satisfied. Engine clutch-engaged charging control time is determined from the engine clutch disengaging time and the residual purge gas consuming time. The method includes closing a purge control solenoid valve and starting to perform engine clutch-engaged charging control. The engine clutch-engaged charging control is maintained for the determined engine clutch-engaged charging control time and then engine clutch disengaging control is performed for the determined engine clutch disengaging time. The engine is stopped after the engine clutch disengaging control is performed.

18 Claims, 4 Drawing Sheets

(51) Int. Cl.
  *F02M 25/08*  (2006.01)
  *F02D 41/14*  (2006.01)
  *F02M 35/10*  (2006.01)
  *B60W 10/06*  (2006.01)
  *B60W 20/40*  (2016.01)
  *B60L 53/00*  (2019.01)
  *B60K 6/48*  (2007.10)

(52) U.S. Cl.
  CPC ... *B60K 2006/4825* (2013.01); *B60Y 2200/92* (2013.01); *B60Y 2300/91* (2013.01); *B60Y 2400/112* (2013.01); *F02D 2041/1433* (2013.01); *F02D 2200/101* (2013.01); *F02D 2200/1002* (2013.01)

FIG. 1

RELATED ART

RELATED ART

METHOD AND SYSTEM OF CONTROLLING HYBRID ELECTRIC VEHICLE FOR REMOVING RESIDUAL PURGE GAS

CROSS REFERENCE TO RELATED APPLICATION(S)

This application claims the benefit of Korea Patent Application No. 10-2018-0151743, filed Nov. 30, 2018, which is hereby incorporated by reference in its entirety into this application.

BACKGROUND

1. Technical Field

The present invention relates to a method of controlling a hybrid electric vehicle and, more particularly, to a method of controlling a hybrid electric vehicle for efficiently consuming and removing purge gas that remains in a purge path within a purge system.

2. Description of the Related Art

As known, gas that results from evaporating fuel, that is, fuel evaporation gas such as hydrocarbon (HC) that contains a fuel component, occurs in a fuel tank of a vehicle. Therefore, to prevent the atmosphere from being contaminated with the fuel evaporation gas, a canister that collects the fuel evaporation gas generated from the fuel tank and stores the collected fuel evaporation gas is installed in the vehicle.

In particular, a casing of the canister is filled with absorbent material that absorbs the fuel evaporation gas that flows from the fuel tank. Activated carbon is commonly used as the absorbent material. The activated carbon in the canister has a function of absorbing hydrocarbon (HC) or the like, which is a fuel component, from the fuel evaporation gas that is introduced into the casing.

Additionally, the canister causes the fuel evaporation gas to be absorbed to the absorbent material when an engine is stopped. Conversely, when the engine operates, the canister allows the fuel evaporation gas, absorbed to the absorbent material, to be detached by pressure of air flowing in from the outside (the atmosphere) and supplies the detached gas to an engine intake system along with the air.

An operation of transporting the fuel evaporation gas collected in the canister into the engine is referred to as a purge operation. Gas flowing from the canister into the engine is purge gas. The purge gas is gas, such as hydrocarbon detached from the absorbent material in the canister, which results from mixing a fuel component and air.

In addition, a purge control solenoid valve (hereinafter referred to as "PCSV") for adjusting the purge operation is installed in a purge line that connects a purge port in the canister and the engine intake system. The PCSV is a valve that opens when the purge operation is performed while the engine operates. In the purge system that includes the PCSV, the fuel evaporation gas (the purge gas) collected in the canister is purged into the engine intake system through the PCSV in an open state and is combusted in the engine. The PCSV is a valve that is operated by a controller, for example, an engine control unit (ECU). Purge control that opens or closes the PCSV (e.g., turns on or off the purge operation), or adjusts the opening degree of the PCSV, according to a vehicle driving state, is performed to control the fuel evaporation gas.

A general configuration of the canister will be described in more detail below. Connected to the casing of the canister are a purge port which is connected to the engine intake system and from which the fuel evaporation gas is transported to the engine side, a loading port which is connected to the fuel tank and into which the fuel evaporation gas is introduced, and an atmosphere port connected to an air filter (that is, a canister filter) and through which air in the atmosphere flows.

A partition wall, which partitions the internal space in the casing into a space in which the atmosphere port is positioned and a space in which the purge port and the load port are positioned, is installed in the internal space within the casing. The fuel evaporation gas introduced from the fuel tank through the loading port passes through the internal space that is partitioned by the partition wall. Simultaneously, hydrocarbon, which is a fuel component, is absorbed in the absorbent material.

In addition, while the engine operates, when the PCSV is opened by the controller, and thus suctions pressure, that is, engine's negative pressure, is applied from the engine intake system to the internal space in the canister through the purge port, air is transported the air filter and the atmosphere port. At this time, the purge gas that is detached by the air from the absorbent material is discharged from the canister through the purge port and flows into the engine. For this purge operation, the engine's negative pressure has to be applied to the canister through the purge line and the purge port.

While operating the engine, through the purge control, the purge gas (the fuel evaporation gas) is introduced from the canister to an engine combustion chamber along with intake air and is then combusted. At this time, the largest amount of purge gas has to be introduced, by a difference in pressure between the canister and the engine intake system, into the combustion chamber for the canister to sufficiently collect the fuel evaporation gas thereafter.

A trend in recent years has been to reduce the number of times that an engine purge operation is performed and thus to reduce consumption of fuel by the vehicle. Particularly, for a continuously variable valve lift (CVVL) engine or an HEV/PHEV engine, the number of times that the purge operation is performed has to be reduced due to a reduction in an engine's negative pressure area. In addition, for a vehicle that is equipped with a turbo charger, negative pressure of the engine intake system, such as an intake manifold, is relatively low, and therefore, it may be difficult to perform the purge operation in the canister.

In the hybrid electric vehicle (HEV/PHEV), a driving area where engine torque is high is used to improve efficiency of the engine. Particularly, for the hybrid electric vehicle that is equipped with the turbo charger, pressure of the intake system in the driving area is greater than that of the canister, and therefore it may be difficult to perform the purge operation. An active purge system is a developed technology for solving the problem described above, and is useful for vehicles including general engine vehicles, which have difficulty in accomplishing canister purge performance and efficiency, using only the negative pressure of the engine intake system, for example, for hybrid electric vehicles that are environment-friendly vehicles and turbo charger-equipped vehicles.

The active purge system is a system in which an active purge pump (APP) is installed on a duct (e.g., the purge line) that connects the purge port in the canister and the engine intake system, and in which the purge gas is discharged by the pump from the canister to the engine. In the active purge system, sensors are installed at positions in front of and behind the pump, on the duct. The controller is configured to actively operate pump drive based on values measured by the sensors. Thus, the purge operation in the canister is performed even during insufficient pressure of the engine intake system.

Figure 1:
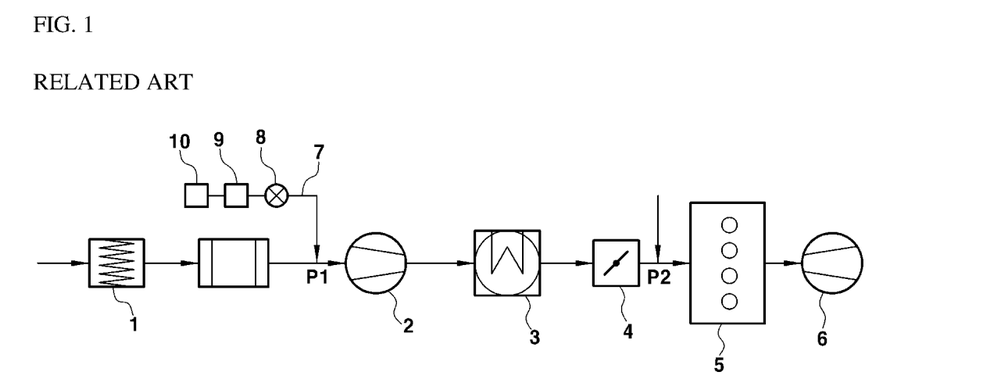
FIG. 1 is a diagram illustrating a problem with an active purge system according to the related art.

The purge gas is forced into the engine intake system using the pump, and therefore, it is possible that the purge operation is performed regardless of engine intake pressure. On the other hand, FIG. 1 is a diagram for describing the problem with the active purge system according to the related art, and illustrates a position at which the purge line and the PCSV are connected to the engine intake system within the purge system. "P1" depicts a position at which the purge line and the PCSV in the active purge system are connected to each other. "P2" depicts a position at which a purge line and a PCSV in an existing general purge system, which is not the active purge system, are connected to each other. In addition, reference numeral 9 depicts the active purge pump, and reference numeral 10 depicts the canister.

In FIG. 1, an air filter 1, a compressor 2 of a turbo charger, an intercooler 3, a throttle valve 4, and an engine 5, which are arranged along an engine intake line, are illustrated, and a turbo 6 of the turbo charger, which is positioned on an engine exhaust line, is illustrated. When exhaust gas discharged from the engine 5 rotates the turbine 6, rotary power of the turbine 6 rotates the compressor 2 that is coupled to the same shaft, and the compressor 2, in turn, supercharges the engine 5 with the air that is brought in and compressed.

As illustrated, in the existing general purge system, the position P2 at which the purge line and the PCSV are connected to each other is proximate to the engine 5. Therefore, the path between the PCSV (not illustrated) and the engine 5 is short and there is no concern that the purge gas will remain in this path and the engine intake system. However, in a vehicle in which the active purge system is installed along with the turbo charger, a purge line 7 that connects between a purge port in a canister 10 and the engine intake system is connected to the position P1 in front of the compressor 2 and a PCSV 8 is installed on the purge line 7.

Therefore, the installation of the compressor 2, the intercooler 3, and the like forms a complex structure of the engine intake system, and thus a position of the PCSV 8 has to be located at a farther distance from the engine than in the general purge system. In summary, when the position P1 is a connection position in the active purge system, a path between the PCSV 8 and the engine 5 is long and thus the purge gas which is not combusted in the path remains within the path.

When the engine is stopped, the purge gas that, as described above, remains in the path between the PCSV 8 and the engine 5 may flow in the reverse direction along the path, and the purge gas that flows in the reverse direction may be discharged, as evaporation gas, into the atmosphere. Therefore, a driver who parks the vehicle in a garage is exposed to the risk of inhaling the evaporation gas, and causes failure to comply with gas regulations.

SUMMARY

Therefore, an object of the present prevention is to provide a method and system of controlling a hybrid electric vehicle that is capable of efficiently consuming and removing purge gas remaining in a purge path within a purge system without additionally causing an engine to operate.

According to an aspect of the present invention, a method of controlling a hybrid electric vehicle may include: determining whether a condition for turning off an engine is satisfied in the hybrid electric vehicle that is equipped with a canister purge system; determining engine clutch disengaging time and residual purge gas consuming time from engine driving status information when the condition for turning off the engine is satisfied; determining engine clutch-engaged charging control time from the engine clutch disengaging time and the residual purge gas consuming time; closing a purge control solenoid valve and starting to perform engine clutch-engaged charging control for charging a battery by operating a motor with a generator that uses output power of the engine; maintaining the engine clutch-engaged charging control for the determined engine clutch-engaged charging control time and then performing engine clutch disengaging control for the determined engine clutch disengaging time; and stopping the engine after the engine clutch disengaging control is performed, in which residual purge gas that remains in a purge path between the purge control solenoid valve and the engine flows into the engine during the engine clutch-engaged charging control and the engine clutch disengaging control and is then combusted.

Therefore, according to the method of controlling a hybrid electric vehicle to remove the residual purge gas, while the engine clutch-engaged charging control and the engine clutch disengaging control while the engine operates are performed in an engine stop control process that is performed after an engine stop request is detected, a purge valve may be closed and the residual purge gas may be removed. Therefore, the residual gas may be efficiently removed without additionally operating the engine for the purpose of removing the residual gas, and active purge control may be realized that complies with evaporation gas regulations.

In addition, in a parallel mode before the engine is stopped in the engine stop control process, the residual gas is consumed and the residual gas is also efficiently consumed, considering both the engine clutch-engaged charging control time and the engine clutch disengaging time that reflect the predicted residual purge gas consuming time. Therefore, an effect of reducing consumption of fuel is achieved compared with methods in the related art in which the residual gas is consumed by additionally causing the engine to operate in an idle mode and so on.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" or "approximately" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described in detail below with reference to the accompanying drawings. Repeated descriptions and descriptions of known functions and configurations which have been deemed to make the gist of the present invention unnecessarily obscure will be omitted below. The exemplary embodiments of the present invention are intended to fully describe the present invention to a person having ordinary knowledge in the art to which the present invention pertains. Accordingly, the shapes, sizes, etc. of components in the drawings may be exaggerated to make the description clearer.

An exemplary embodiment of the present invention will be described in detail below with reference to the drawings in such a manner that a person of ordinary skill in the art to which the present invention pertains is enabled to practice without undue experimentation. However, the present invention is not limited to the embodiment that is described here and may be implemented into other exemplary embodiments. When the expression "includes a certain constituent element" is used throughout the specification, unless otherwise described, this means that any other constituent element may further be included, not that any other constituent element is excluded.

The present invention relates to a method of controlling a hybrid electric vehicle and, more particularly, to a method of controlling a hybrid electric vehicle for efficiently removing purge gas that remains in a purge path within a purge system. This control method according to the present invention finds application in a hybrid electric vehicle that is equipped with an active purge system and further finds application in a hybrid electric vehicle that is equipped with an active purge system and a turbo charger.

An object of the present invention is to solve a problem caused by residual gas by removing purge gas that remains in a path between a purge control solenoid valve (PCSV) (hereinafter referred to as "purge valve" for short) in the purge system and an engine. The purge gas remaining in the purge path within the purge system is referred to as "residual purge gas." The purge path within the purge system refers to a path between a canister and the engine. A path in which the residual purge gas remains after the engine is stopped is a path between the purge valve and an engine cylinder.

Configurations of an engine air-intake system and of the active purge system will be described below with reference to FIG. 1 according to the related art. As illustrated in FIG. 1, in an active purge system of a turbo charger-equipped vehicle, a purge line 7 is connected to a position P1 in front of a compressor 2, which is located on an engine air-intake line, and thus the compressor 2, an intercooler 3, and a throttle valve 4 are positioned in a path between a purge valve 8 and an engine 5.

In particular, a method according to the related art may be considered in which the residual purge gas present in the purge path is circulated into the engine 5 and is combusted. In other words, the purge valve 8 is closed before the engine 5 is stopped, and then the engine 5 is additionally operated. Thus, the residual purge gas that is present in the purge path is forced into the engine 5 and then is combusted. However, this unnecessarily causes the engine 5 to operate, thereby increasing the consumption of fuel by the vehicle.

Therefore, according to the present invention, when an engine of the hybrid electric vehicle is stopped, to consume and remove the residual purge gas, a method is used in which the residual purge gas may be circulated into the engine and thus may be combusted in the engine while engine clutch-engaged charging control and engine clutch disengaging control are performed.

The engine clutch-engaged charging control is described as follows.

Figure 2:
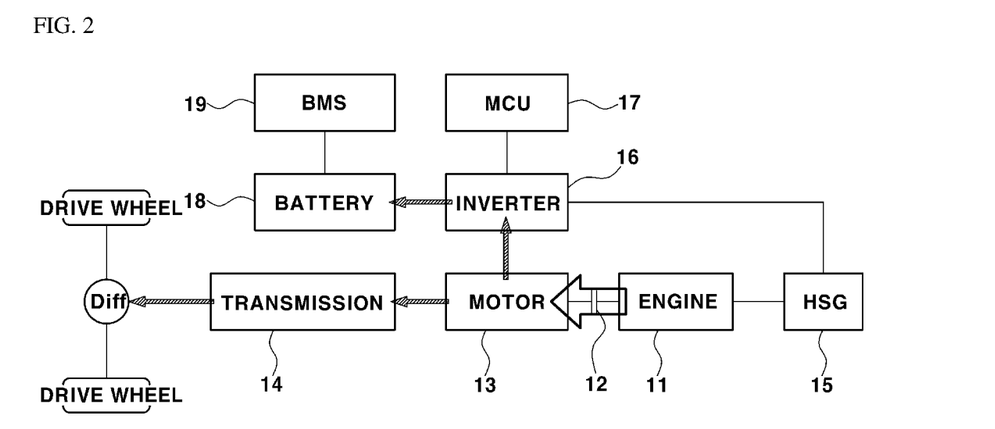
FIGS. 2 and 3 are diagrams each illustrating a driving power transmission configuration and a mode-categorized state of a hybrid electric vehicle according to an exemplary embodiment of the present invention.
Figure 3:
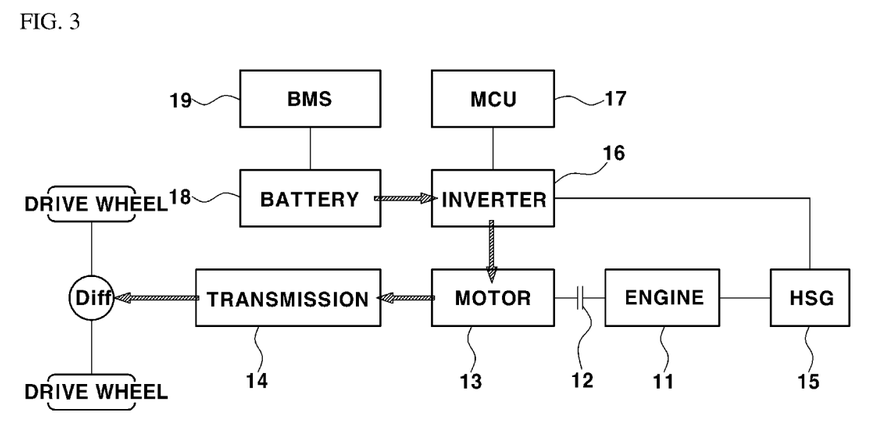

FIGS. 2 and 3 are diagrams each illustrating a driving power transmission configuration and a mode-categorized state of the hybrid electric vehicle according to an exemplary embodiment of the present invention. FIGS. 2 and 3 illustrate a driving power transmission configuration for a transmission mounted electric device (TMED) type, in which a transmission 14 is positioned on the output side of the motor 13.

A TMED hybrid system includes an engine 11 and the motor 13 arranged in series as driving sources for vehicle operation, an engine clutch 12 that enables and disables a flow of driving power between the engine 11 and the motor 13, the transmission 14 that shifts for transmission of rotary driving power of the engine 11 and motor 13 to a drive shaft, and a hybrid starter and generator (HSG) 15 connected to the engine 11 and configured to transmit driving power.

In addition to this configuration, the TMED hybrid system may include an inverter 16 configured to operate the motor 13, a motor control unit (MCU) 17 configured to operate the motor 13, a high-voltage battery 18 configured to supply operating power to the motor 13, and a battery management system (BMS) 19 configured to perform battery control and management. In this configuration, through an engaging or disengaging operation, the engine clutch 12 may enable or disable the flow of driving power between the engine 11 and the motor 13.

The battery 18, as a driving power source (e.g., an electric power source), may be connected to the motor 13 and the hybrid starter and generator 15 via the inverter 16 to allow charging and discharging. To operate the motor 13 and the hybrid starter and generator 15, the inverter 16 may be configured to convert direct current (DC) of the battery 18 into three-phase phase alternating current (AC) and apply resulting current to the motor 13 and the hybrid starter and generator 15. A battery controller 19 may be configure to obtain battery status information, such as battery voltage, current, temperature, and a state of charge (SOC) (%) and transmit the battery status information to any other controllers within a vehicle or use the information to execute battery charging and discharging.

In the TMED hybrid system with the configuration described above, when a driver decreases output power of the vehicle by releasing an accelerator pedal or decreasing the degree to which a PCSV is opened, the engine clutch is disengaged (separated) and thus the engine is stopped. Thus, a change from a parallel mode as illustrated in FIG. 2 to an electric vehicle (EV) mode as illustrated in FIG. 3 occurs.

However, in preparation for a situation where the driver will again depress or engage an accelerator or where a SOC of the battery will decrease below an optimal control range, the engine clutch is not immediately disengaged, and the parallel mode may be maintained for a particular period of time. Control that, in this manner, charges the battery with electric energy that is generated in the motor by operating the motor with a generator that uses output power of the engine while the parallel mode is maintained is referred to as "engine clutch-engaged charging control."

According to the present invention, to efficiently discharge the residual purge gas remaining in the purge path within the purge system, the residual purge gas may be circulated into the engine and may be combusted, while the engine clutch-engaged charging and the engine clutch disengaging control are performed in a process of stopping the engine. Accordingly, residual purge gas consuming time and engine clutch disengaging time may be predicted from the engine driving status information obtained using a sensor or the like mounted within the vehicle, additionally considering a condition for consuming the residual purge gas in determining engine clutch-engaged charging control time. Then, the engine clutch-engaged charging control time may be determined from the predicted time information.

Factors for exerting an influence on the residual purge gas consuming time, as factors for predicting the residual purge gas consuming time, are an amount of engine's air intake and engine's revolutions per minute (rpm). Of the two factors, the amount of engine's air intake fluctuates and thus difficult to use as a control factor. Therefore, to predict the residual purge gas consuming time, engine torque (Nm) that is in proportion to the amount of engine's air intake may be used instead of the amount of engine's air intake.

In addition, factors for exerting an influence on the engine clutch disengaging time, as factors for predicting the engine clutch disengaging time, are engine torque and oil temperature in the transmission. According to the exemplary embodiment of the present invention, the engine torque of these two factors may be used as the control factor to predict the engine clutch disengaging time. Therefore, the residual purge gas consuming time may be predicted using the engine's revolutions per minute and the engine torque among real-time engine driving status information, the engine clutch disengaging time may be predicted using the engine torque, and the engine clutch-engaged charging control time may be determined from the residual purge gas consuming time and the engine clutch disengaging time that are predicted. At this point, the engine clutch-engaged charging control time may be determined as time that results from deducting the engine clutch disengaging time from the residual purge gas consuming time.

Figure 4:
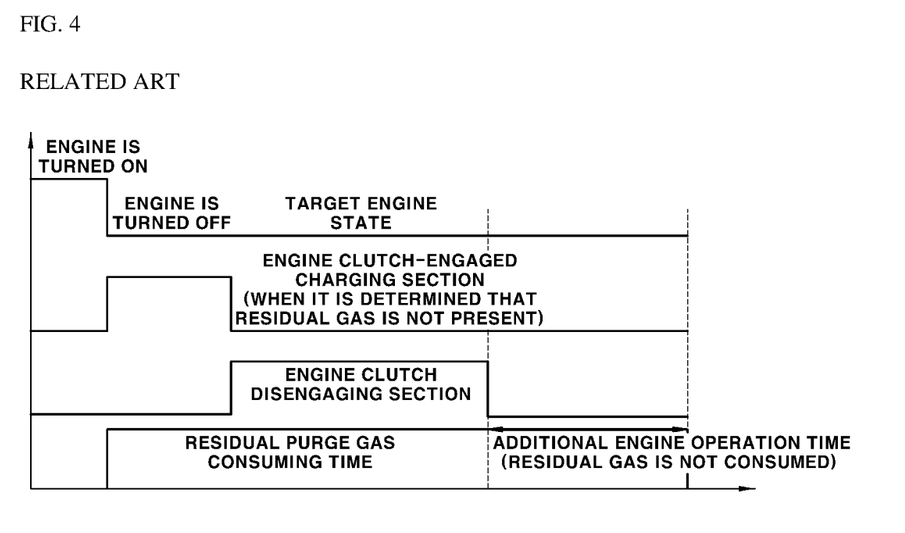
FIG. 4 is a diagram illustrating an engine clutch-engaged charging section and an engine clutch disengaging section that result when an engine is stopped according to the related art.

FIG. 4 is a diagram illustrating an engine clutch-engaged charging section and an engine clutch disengaging section that result when the engine is stopped according to the related art. FIG. 4 illustrates a known process of stopping an engine when the residual gas is not present, that is, a general process of stopping an engine at the time of the absence of the residual gas. A target engine state is off in the drawings refers to the target state to be attained, not that the engine is actually in an off state (e.g., a state where the engine is stopped).

In other words, the engine is still in an operating state for the engine clutch-engaged charging section for which the battery is charged by operating the motor with the generator that uses the output power of the engine. The engine clutch disengaging section is a section for which the engine torque is decreased to a level at which the engine clutch is possibly disengaged, and therefore is a section for which the engine is also still in the operating state.

However, from the engine clutch disengaging section onwards, the engine will be in the off state that is the target state. Therefore, if the residual purge gas is consumed immediately before the engine is stopped, it is necessary that, for the engine clutch-engaged charging section and the engine clutch disengaging section, the residual purge gas is circulated into the engine and is combusted. In addition, it is necessary that the time necessary to consume the residual purge gas is the same as the time that results from summing the engine clutch-engaged charging control time and the engine clutch disengaging time.

When, as illustrated in FIG. 4, the residual purge gas consuming time is greater than the sum of the engine clutch-engaged charging control time and the engine clutch disengaging time, insufficient time results for consuming the residual purge gas. Therefore, to consume the remaining residual gas that is not consumed, from the engine clutch disengaging section onwards, the engine has to be additionally operated. However, when the engine clutch-engaged charging control time and the engine clutch disengaging time are determined without taking into consideration the residual purge gas consuming time, as illustrated in FIG. 4, the residual gas is not all consumed thus causing unconsumed residual gas to remain in the path. Thus, the engine needs to be additionally operated to consume the remaining unconsumed residual gas.

Therefore, according to the present invention, the residual purge gas consuming time may be predicted and then the engine clutch-engaged charging control time and the engine clutch disengaging time, the sum of which is greater than the residual purge gas consuming time, may be determined. Then, for the residual purge gas consuming time, the residual purge gas may be circulated into the engine and all may be consumed. Thus, the residual purge gas may be maximally removed without additional operation of the engine.

According to the present invention, the engine clutch disengaging time may be used since it takes time to reduce pressure of the engine clutch and it takes time to reduce the engine torque to the level at which the engine clutch is possibly disengaged. Usually, the clutch is smoothly disengaged when the engine torque is at or below approximately 50 Nm. A current engine torque value has an influence on the disengaging of the engine clutch, and the time necessary to disengage the engine clutch may vary with the engine torque value.

Therefore, according to the present exemplary embodiment, setting information in which the engine clutch disengaging time is set as a value that corresponds to the engine torque may be used in determining the engine clutch disengaging time, and may be a map of data that defines, in advance, a correlation relationship between the engine torque and the engine clutch disengaging time. Table 1 below shows an example of the setting information in which the engine clutch disengaging time (sec) is set as the value that corresponds to the engine torque (Nm).

TABLE 1

|  | engine torque (Nm) | | | | |
|---|---|---|---|---|---|
|  | 50 | 100 | 120 | 150 | 200 |
| engine clutch disengaging time (sec) | 0 | 0.3 | 05 | 0.6 | 0.9 |

The map as the setting information described above may be one that results from setting and adjusting the engine clutch disengaging time according to the engine torque value, using data obtained through prior evaluation and experiment processes. According to the present invention, the map may be input in advance and stored in a controller and then may be used in determining the engine clutch disengaging time from the engine torque value.

Regarding a relationship between the engine torque and the engine clutch disengaging time, the higher the engine torque, the more time it takes to reduce the engine torque to the level at which the engine clutch is possibly disengaged. Thus, according to the present invention, as illustrated in Table 1, the higher the engine torque, the longer the engine clutch disengaging time may be set to be. The residual purge gas consuming time is time for which the residual purge gas that is present in the purge path within the purge system and the air-intake system is circulated into the engine and is combusted when the purge valve is closed. The residual purge gas consuming time is related to the engine's revolutions per minute and an amount of air intake that is used during the engine's revolutions.

Particularly, the amount of air intake fluctuates while operating the engine. Thus, if the amount of air intake is used, many compensation coefficients are necessary for stable control. Therefore, according to the present invention, the engine torque that is in proportion to the amount of air intake is referred to when predicting the residual purge gas consuming time. Therefore, according to the present invention, the setting information in which the residual purge gas consuming time may be set as a value that corresponds to the engine torque and the revolutions per minute may be used in determining the residual purge gas consuming time, and may be the map as data that defines, in advance, the correlation relationship between both the engine torque and the engine's revolutions per minute and the engine clutch disengaging time.

Table 2 shows an example of the setting information in which the residual purge gas consuming time (sec) is set as the value that corresponds to the engine torque (Nm) and the revolutions per minute (rpm).

TABLE 2

|  |  | engine torque (Nm) | | | | |
|---|---|---|---|---|---|---|
|  |  | 50 | 100 | 120 | 150 | 200 |
| engine's revolutions per minute (rpm) | 1000 | 2 | 1.5 | 1.3 | 1.2 | 1 |
|  | 2000 | 1.6 | 1.3 | 1.2 | 0.9 | 0.7 |
|  | 3000 | 1.3 | 1.1 | 0.9 | 0.6 | 0.4 |
|  | 4000 | 1 | 0.7 | 0.5 | 0.3 | 0.1 |

The map as the setting information described above may be one that results from setting and adjusting the residual purge gas consuming time, according to the engine torque and the engine's revolutions per minute, using the data obtained through the prior evaluation and experiment processes. According to the present invention, the map may be input in advance and stored in the controller and then may be used in determining the residual purge gas consuming time from the engine torque and the revolutions per minute.

According to the present invention, regarding a relationship between both the engine torque and the engine's revolutions per minute and the engine clutch disengaging time, as illustrated in Table 2, under the condition of the same number of the engine's revolutions per minute, the higher the engine torque is, the shorter the residual purge gas consuming time may be set to be, and under the condition of the same engine torque, the greater the number of engine's revolutions per minute is, the shorter the residual purge gas consuming time may be set to be.

A numerical value indicating time in Tables 1 and 2 is given as an example, and the present invention is not limited to this numerical value. It may be possible that the numerical value is the same as various values that are adjusted based on a vehicle's state and the like. Finally, the engine clutch-engaged charging control time may be determined using the residual purge gas consuming time and the engine clutch disengaging time, which are determined as described above, and at this time, the engine clutch-engaged charging control time may be determined as the time that results from subtracting the engine clutch disengaging time from the residual purge gas consuming time.

In this manner, according to the present invention, the residual purge gas consuming time may be defined as the sum of the engine clutch-engaged charging control time and the engine clutch disengaging time, and therefore, for the engine clutch-engaged charging control and the engine clutch disengaging section, the residual purge gas may be combusted in the engine and thus may be removed. Particularly, according to the present invention, the battery may be charged by operating the motor with the generator that uses the output power of the engine, without stopping the engine clutch-engaged charging control time determined as described above, and, therefore, while the residual gas is consumed, electric energy may be stored in the battery instead of causing the engine to operate and thus using fuel.

Accordingly, without additionally operating the engine to remove the residual purge gas that is present in the purge path, the purge valve may be closed and the residual purge gas may be combusted in the engine and thus removed, for a control section for which the engine is still in operation, in an engine stop control process performed after an engine stop request is made, that is, during the engine clutch-engaged charging control and the engine clutch disengaging control performed immediately before the engine is stopped.

Finally, according to the present invention, consumption of energy necessary for consuming the residual purge gas may be minimized and it is unnecessary to additionally operate the engine for the purpose of consuming the residual purge gas. Therefore, a problem of increasing the consumption of fuel due to the removal of the residual purge gas may be solved.

Figure 6:
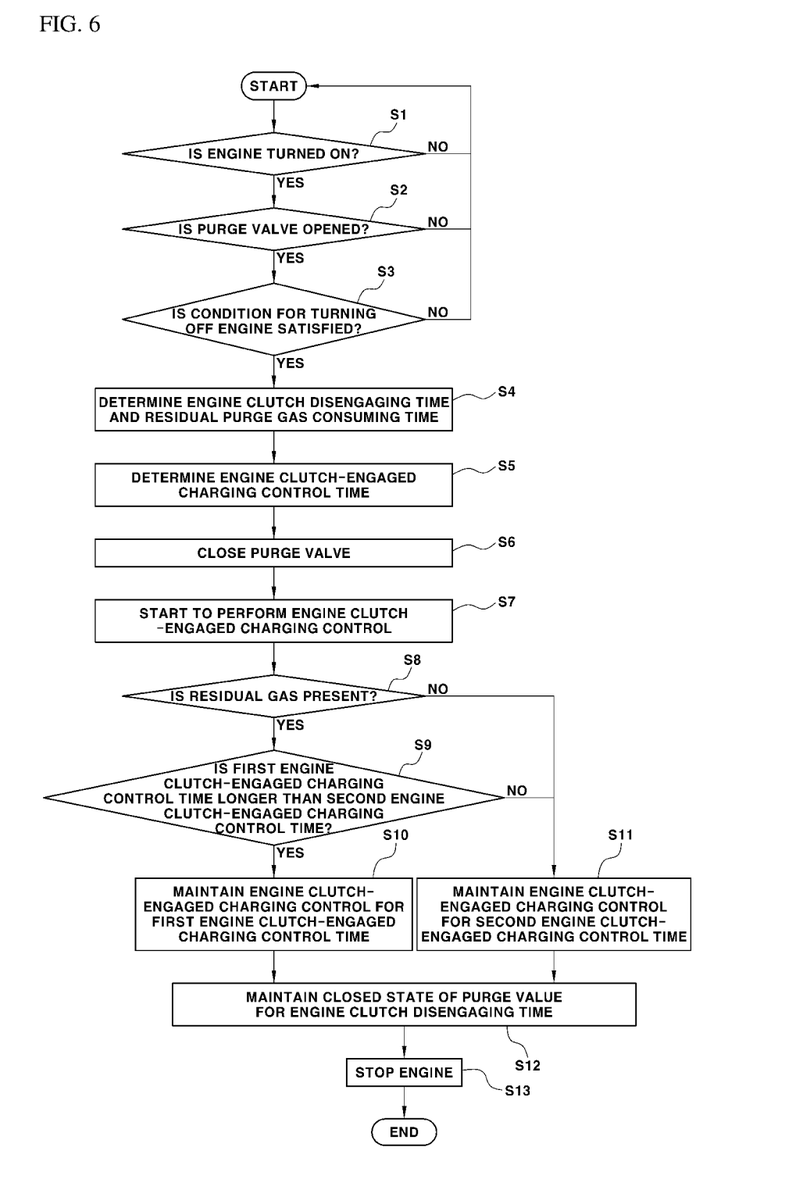
FIG. 6 is a flowchart illustrating the control process according to an exemplary embodiment of the present invention.

FIG. 6 is a flowchart illustrating a process of controlling the hybrid electric vehicle according to the exemplary embodiment of the present invention and illustrates the control process that is performed by the controller, in a stepwise manner. First, the controller may be configured to determine whether a condition (e.g., an engine stop condition) for turning off the engine is satisfied when the engine is turned on and thus is in operation and when the purge valve is opened (S1, S2, and S3).

At this point, if the condition for turning off the engine is satisfied, the controller may be configured to determine the engine clutch disengaging time and the residual purge gas consuming time (S4), and subsequently determine the engine clutch-engaged charging control time from the engine clutch disengaging time and the residual purge gas consuming time (S5). Subsequently, the controller may be configured to close the purge valve (S6), then start to perform the engine clutch-engaged charging control (S7), and subsequently determine whether the residual purge gas is present within the purge path (S8). At this time, based on a signal of a sensor installed in the purge path and configured to detect a concentration of hydrocarbon, whether the residual purge gas is present may be determined.

If the residual purge gas is not present, the engine clutch-engaged charging control may be performed only for the engine clutch-engaged charging control time, as before (as known), and subsequently the engine clutch disengaging control may be performed (refer to FIG. 4). At this point, engine clutch-engaged charging control time as usual (hereinafter referred to "second engine clutch-engaged charging control time") is different from the engine clutch-engaged charging control time (hereinafter referred to "first engine clutch-engaged charging control time") that, according to the present invention, is determined from the engine clutch disengaging time and the residual purge gas consuming time, and may be time that is set, in advance, as a fixed value, regardless of the engine driving status information, such as the engine torque or the engine's revolutions per minute.

Figure 5:
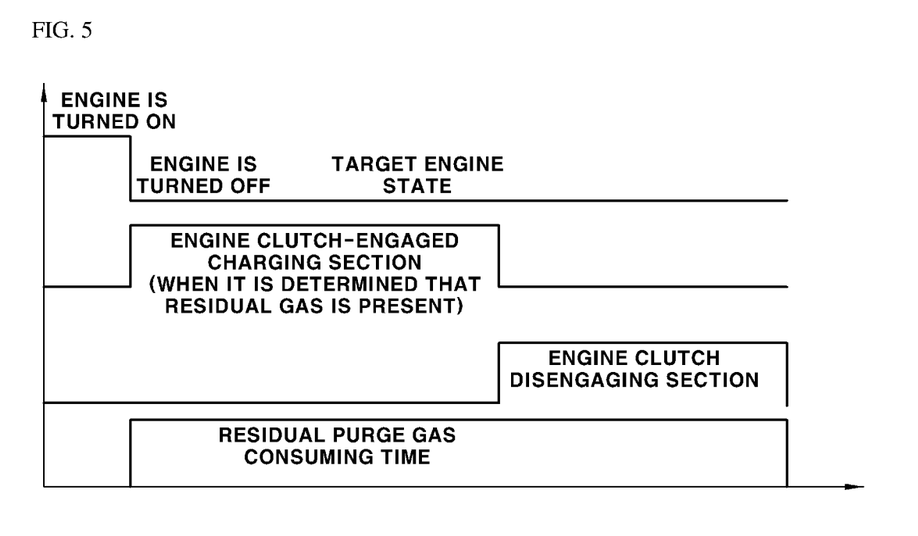
FIG. 5 is a diagram illustrating the engine clutch-engaged charging section and the engine clutch disengaging section that results when the engine is stopped in a control process according to an exemplary embodiment of the present invention.

In contrast, in response to determining that the residual purge gas is present, the first engine clutch-engaged charging control time and the second engine clutch-engaged charging control time may be compared with each other (S9). When the first engine clutch-engaged charging control time is greater than the second engine clutch-engaged charging control time, a closed state of the purge valve and the engine clutch-engaged charging control may be maintained for the first engine clutch-engaged charging control time (S10) (refer to FIG. 5).

However, when the second engine clutch-engaged charging control time is greater than the first engine clutch-engaged charging control time, the closed state of the purge valve and the engine clutch-engaged charging control may be maintained for the second engine clutch-engaged charging control time (S11) (refer to FIG. 4). The maintaining of the closed state of the purge valve and the engine clutch-engaged charging control in this manner is for a process of circulating the residual purge gas within the purge path into the engine and combusting the residual purge gas for removal and consumption.

At this time, the residual purge gas may be transported into a combustion chamber of the engine in the closed state of the purge valve and then may be combusted. Subsequently, for the engine clutch disengaging time, the closed state of the purge valve may be maintained, and the engine clutch disengaging control may be performed (S12). Then, the engine may be stopped (S13). While the engine clutch engaging control is performed in the closed state of the purge valve, the residual purge gas may also be circulated into the engine and combusted.

In addition, the engine clutch-engaged charging control may be performed in Step S10 and then the engine clutch disengaging control may be performed. The engine clutch disengaging time at this point is time (the engine clutch disengaging time in FIG. 5) that is obtained from the engine torque using the setting information as in Table 1. In addition, the engine clutch-engaged charging control may be performed in Step S11 and the engine clutch disengaging control may be performed. The engine clutch disengaging time at this point may be time (the engine clutch disengaging time in FIG. 4) determined with an existing method.

In particular, according to the present invention, while the engine clutch-engaged charging control and the engine clutch disengaging control during which a state where the engine operates is maintained are performed in the engine stop control process that is performed after the engine stop request is detected, the purge valve may be closed and the residual purge gas may be removed. Therefore, it may be possible that the residual gas is efficiently removed without additionally operating the engine for the purpose of removing the residual gas, and active purge control may be realized that complies with evaporation gas regulations.

In addition, in the parallel mode before the engine is stopped in the engine stop control process, the residual gas may be efficiently consumed considering both the engine clutch-engaged charging control time and the engine clutch disengaging time that reflect the predicted residual purge gas consuming time. Therefore, an effect of reducing the consumption of fuel may be achieved compared with methods in the related art in which the residual gas is consumed by additionally operating the engine in an idle mode and so on.

The exemplary embodiment of the present invention is described in detail above, and the scope of the present invention is not limited to this. Various modifications and improvements that use the basic concept of the present invention that is claimed in claims, which are made by a person of ordinary skill in the art, fall within the scope of the present invention.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As described above, optimal exemplary embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A system of controlling a hybrid electric vehicle, comprising:
a memory configured to store program instructions; and
a processor configured to execute the program instructions, the program instructions when executed configured to:
determine whether a condition for turning off an engine is satisfied in the hybrid electric vehicle that is equipped with a canister purge system;
determine engine clutch disengaging time and residual purge gas consuming time from engine driving status information when the condition for turning off the engine is satisfied;
determine engine clutch-engaged charging control time from the determined engine clutch disengaging time and the determined residual purge gas consuming time;
close a purge control solenoid valve and starting to perform engine clutch-engaged charging control for charging a battery by operating a motor with a generator that uses output power of the engine;
maintain the engine clutch-engaged charging control for the determined engine clutch-engaged charging control time and then performing engine clutch disengaging control for the determined engine clutch disengaging time; and
stop the engine after the engine clutch disengaging control is performed,
wherein residual purge gas that remains in a purge path between the purge control solenoid valve and the engine is transported into the engine during the engine clutch-engaged charging control and the engine clutch disengaging control and is combusted.

2. The system of claim 1, wherein the canister purge system is an active purge system in which a pump suctions in purge gas from a canister and discharges the purge gas to an engine intake system.

3. The system of claim 1, wherein the engine clutch disengaging time is a value determined based on engine torque of the engine driving status information.

4. The system of claim 3, wherein the engine clutch disengaging time is determined by a map based on the engine torque, and, in the map, the higher value the engine torque has, the longer the engine clutch disengaging time is set to be.

5. The system of claim 1, wherein the residual purge gas consuming time is a value determined based on the engine torque and engine revolutions per minute of the engine driving status information.

6. The system of claim 5, wherein the residual purge gas consuming time is determined by the map based on the engine torque and the engine revolutions per minute, and, in the map, under the condition of a same number of the engine revolutions per minute, the higher the torque is, the shorter the residual purge gas consuming time is set to be.

7. The system of claim 6, wherein in the map, under a condition of the same engine torque, the greater the number of the engine revolutions per minute is, the shorter the residual purge gas consuming time is set to be.

8. The system of claim 1, wherein the engine clutch-engaged charging control time is determined as time that results from subtracting the determined engine clutch disengaging time from the determined residual purge gas consuming time.

9. The system of claim 1, wherein the program instructions when executed are further configured to:
determine whether the residual purge gas is present in the purge path between the purge control solenoid valve and the engine using a sensor after the engine clutch-engaged charging control starts; and
perform the engine clutch-engaged charging control and the engine clutch disengaging control in response to determining that the residual purge gas is present in the purge path.

10. A method of controlling a hybrid electric vehicle, comprising:
determining, by a controller, whether a condition for turning off an engine is satisfied in the hybrid electric vehicle that is equipped with a canister purge system;
determining, by the controller, engine clutch disengaging time and residual purge gas consuming time from engine driving status information when the condition for turning off the engine is satisfied;
determining, by the controller, engine clutch-engaged charging control time from the determined engine clutch disengaging time and the determined residual purge gas consuming time;
closing, by the controller, a purge control solenoid valve and starting to perform engine clutch-engaged charging control for charging a battery by operating a motor with a generator that uses output power of the engine;
maintaining, by the controller, the engine clutch-engaged charging control for the determined engine clutch-engaged charging control time and then performing engine clutch disengaging control for the determined engine clutch disengaging time; and
stopping, by the controller, the engine after the engine clutch disengaging control is performed,
wherein residual purge gas that remains in a purge path between the purge control solenoid valve and the engine is transported into the engine during the engine clutch-engaged charging control and the engine clutch disengaging control and is combusted.

11. The method of claim 10, wherein the canister purge system is an active purge system in which a pump suctions in purge gas from a canister and discharges the purge gas to an engine intake system.

12. The method of claim 10, wherein the engine clutch disengaging time is a value determined based on engine torque of the engine driving status information.

13. The method of claim 12, wherein the engine clutch disengaging time is determined by a map based on the engine torque, and, in the map, the higher value the engine torque has, the longer the engine clutch disengaging time is set to be.

14. The method of claim 10, wherein the residual purge gas consuming time is a value determined based on the engine torque and engine revolutions per minute of the engine driving status information.

15. The method of claim 14, wherein the residual purge gas consuming time is determined by the map based on the engine torque and the engine revolutions per minute, and, in the map, under the condition of a same number of the engine revolutions per minute, the higher the torque is, the shorter the residual purge gas consuming time is set to be.

16. The method of claim 15, wherein in the map, under a condition of the same engine torque, the greater the number of the engine revolutions per minute is, the shorter the residual purge gas consuming time is set to be.

17. The method of claim 10, wherein the engine clutch-engaged charging control time is determined as time that results from subtracting the determined engine clutch disengaging time from the determined residual purge gas consuming time.

18. The method of claim 10, further comprising:
determining, by the controller, whether the residual purge gas is present in the purge path between the purge control solenoid valve and the engine using a sensor after the engine clutch-engaged charging control starts,
wherein, in response to determining that the residual purge gas is present in the purge path, performing, by the controller, the engine clutch-engaged charging control and the engine clutch disengaging control.

* * * * *